Figure 1:
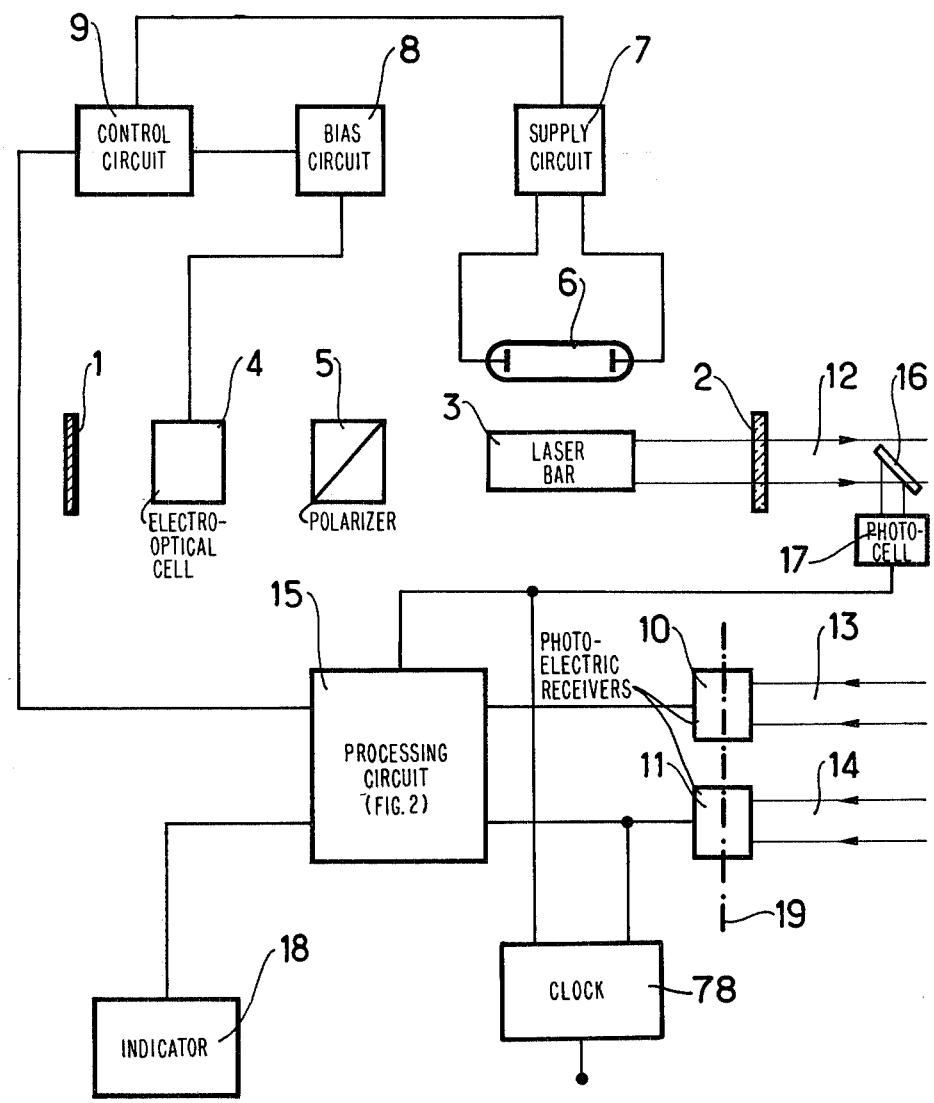

United States Patent [19]

Courrier et al.

[11] 4,182,570
[45] Jan. 8, 1980

[54] DEVICE FOR MEASURING A COMPONENT OF WIND SPEED

[75] Inventors: Gilbert Courrier, Juvisy sur Orge; Michel Duchet, Briis sous Forges; Michele Leblanc, Orsay; Jacques Moirez, Paris, all of France

[73] Assignees: Compagnie Industrielle des Lasers, Marcoussis; Compagnie Generale d'Electricite, Paris; "Societe d'Optique, Precision Electronique et Mecanique" Sopelem, Levallois Perret, all of France

[21] Appl. No.: 924,013

[22] Filed: Jul. 11, 1978

[30] Foreign Application Priority Data

Jul. 21, 1977 [FR] France ............................... 77 22355

[51] Int. Cl.² ........................ G01P 3/36; G01C 3/08
[52] U.S. Cl. ........................................... 356/28; 356/5
[58] Field of Search ................................. 356/28, 5

[56] References Cited
U.S. PATENT DOCUMENTS

| 3,558,898 | 1/1971 | Block et al. ........................ 356/28 |
| 3,584,956 | 6/1971 | Hines et al. ........................ 356/28 |
| 3,753,616 | 8/1973 | Goethert ............................ 356/28 |

OTHER PUBLICATIONS

R. S. Lawrence et al., Applied Optics, 2-1972, vol. 11, 2, p. 239, 356/28.

Primary Examiner—S. C. Buczinski
Attorney, Agent, or Firm—Sughrue, Rothwell, Mion, Zinn and Macpeak

[57] ABSTRACT

A laser generator (1,2,3) is arranged to generate successive pairs of pulses. Two light receivers (10,11) in the vicinity of the laser generator receive echos of the pulses as reflected from a target and a processing circuit (15) calculates the component of wind speed blowing across the laser axis between the laser generator and the target. The device can be combined with laser ranging means and used for artillery control.

6 Claims, 2 Drawing Figures

DEVICE FOR MEASURING A COMPONENT OF WIND SPEED

The present invention relates to devices for measuring a component of wind speed, and more particularly to devices for measuring a weighted average of the component of wind speed in a predetermined direction.

One device of this type uses a correlation method and is described in a article entitled "Use of scintillations to measure average wind across a light beam" by R. S. Lawrence et al, appearing in the U S periodical Applied Optics vol. 11 n° 2, February 1972, at pages 239 to 243.

This device comprises essentially a helium-neon laser generator placed at one point and aimed towards two photoelectric receivers which are oriented to receive a part of the radiation emitted by the laser, together with a circuit for processing the electrical pulses delivered by both of the receivers. This processing circuit is arranged to measure the slope at the origin of the normalized covariance function of the fluctuations in the signals emitted by the receivers. This slope is representative of a weighted mean of the component of the speed of the wind blowing over the path of the laser radiation in the direction of the straight line passing through both of the receivers.

This device has the drawback of being very difficult to apply in a military context since it is not possible in practice to dispose the receivers in the proximity of a target.

The aim of the present invention is to mitigate this drawback.

The present invention provides a device for measuring a component of wind speed, the device comprising:

a laser generator suitable for emitting a laser beam towards a target;

two photo-electric receivers disposed transversally with respect to the emission axis of the laser generator to receive a part of the energy of the said beam; and a circuit for processing the electrical signals delivered by the receivers to determine the slope at the origin of the normalized covariance function corresponding to these signals, the slope being representative of a weighted mean of the component of the speed of the wind blowing on the path of the laser beam in the direction of the straight line passing through the receivers;

wherein the laser generator includes means for emitting said beam in successive groups of two pulses, the pairs of pulses being separated by a predetermined time interval; and wherein the receivers are so disposed in the proximity of the said generator that each receives an echo of the laser pulses returned by the target.

Figure 2:
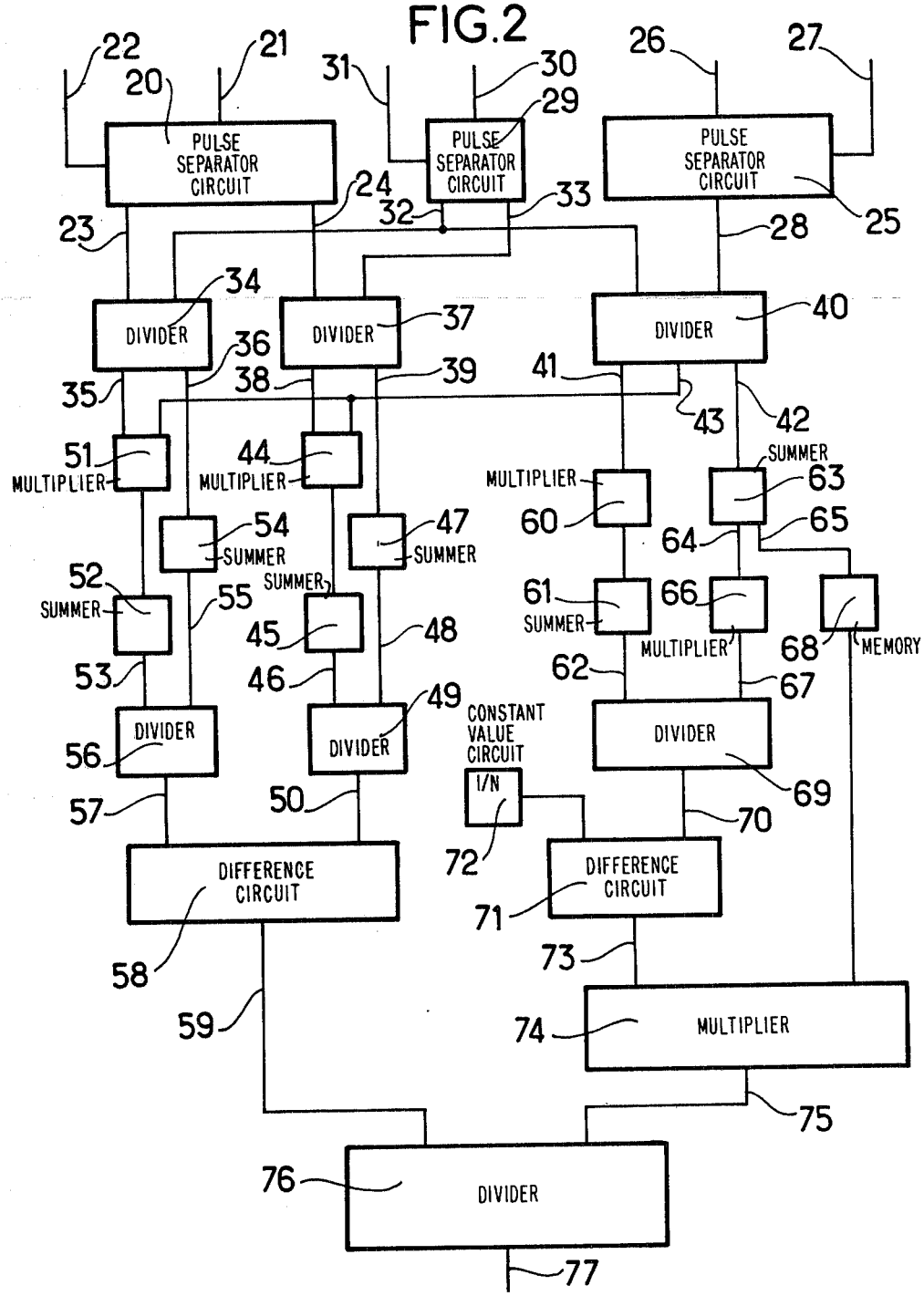

An embodiment of the present invention is described below by way of example with reference to the accompanying drawings in which:

FIG. 1 is a schematic representation of one embodiment of the device in accordance with the invention; and FIG. 2 shows the principal elements of a processing circuit which forms part of the device illustrated in FIG. 1.

In FIG. 1, a laser generator comprises a resonnant optical cavity constituted by two mirrors 1 and 2, the mirror 2 being partially transparent. Between the mirrors 1 and 2 there are disposed a bar of active laser material 3, an electro-optical cell 4 and a polarizer 5. The bar 3 is excitable by the discharge of a flash-tube 6 connected between the terminals of a supply circuit 7. The cell 4 has two electrodes (not shown) connected to the outputs of an bias circuit 8. The circuits 7 and 8 are connected to the outputs of a control circuit 9.

Two photo-electric receivers 10 and 11 are disposed in the proximity of one another and oriented to receive respective echos 13 and 14 of a laser beam 12 emitted by the laser generator towards a target which is not visible on the figure. The receivers 10 and 11 are placed to one side of the laser generator and are aligned on an axis transversal to the axis of the beam 12. The electric outputs of the receivers 10 and 11 are connected to a processing circuit 15 connected to the control circuit 9.

A semi-transparent mirror 16 is disposed at 45° to the path of the beam 12 to divert a small portion of the beam to a photo-cell 17 whose output is connected the circuit 15. The output of the circuit 15 is connected to an indicator device 18.

The device shown in FIG. 1 operates as follows:

The laser generator is aimed so that its beam 12 is directed towards a target. The speed of the wind blowing transversally, e.g. horizontally, between the device and the target is to be measured. The receivers 10 and 11 are therefore aligned on a horizontal axis 19 with respect to which the measurement is to be made.

The beam 12 emitted by the laser generator is constituted by successive groups of two pulses separated by a predetermined time interval. By way of example, the two pulses of each group may have a duration of 30 nanoseconds and be separated between each other by a time interval of 100 microseconds. There are 40 groups of pulses which are separated by intervals of 50 milleseconds, the total emmission time of the laser generator thus being two seconds.

The control circuit 9 causes the flash-lamp 6 to discharge 40 times during these two seconds. The polarizer 5 and the cell 4 are disposed in such a way that oscillation within the cavity is blocked in the absence of a bias potential across the electrodes of the cell 4 which may, for example, be a Pockels cell. In order to trigger an impulse in the cavity, the circuit 9 controls the application of an electrical impulse to the circuit 8 in such a manner as to bias the electrodes of the cell 4 for a very short instant. In the example given, the circuit 9 controls the triggering of two successive laser pulses during one discharge of the lamp 6. These laser pulses being separated by a time interval of 100 microseconds.

Each receiver receives echos of the pulses emitted by the generator and returned by the target. The processing circuit 15 determines, on the basis of the signals delivered by the receivers 10 and 11 and the photo-cell 17, the slope at the origin of the normalized covariance function of the fluctuations in the signals delivered by the receivers 10 and 11.

This slope is representative of a weighted mean of the component of the speed of the wind blowing over the path of the laser beam 12 in the direction 19, between the laser generator and the target.

The weighting function applied to this measurement depends, as explained in the American article mentioned above, on dimensional characteristics of the device, and in particular on the distance between the two receivers 10 and 11.

In the case where the emitted laser pulses are of short duration, the slope at the origin of the covariance function has substantially the following value:

$$\frac{1}{t} \times \frac{\frac{\Sigma A_{1i}B_{2i}}{\Sigma B_{2i}} - \frac{\Sigma A_{1i}B_{1i}}{\Sigma B_{1i}}}{\left[\frac{\Sigma(A_{1i}^2)}{(\Sigma A_{1i})^2} - \frac{1}{N}\right]\Sigma A_{1i}} \quad (1)$$

where t is the time interval separating two pulses of the same group;

N is the number of groups of pulses delivered by the laser generator;

i is an integer less than or equal to N;

$A_{1i}$ is the ratio of a value representative of the electric signal delivered by the receiver 10 when it receives the echo of the first pulse of the i-th group, with respect to a value representative of electric signal delivered by the photo-cell 17 when it receives the first pulse of the i-th group;

$B_{1i}$ is the ratio of a value representative of the electric signal delivered by the receiver 11 when it receives the echo of the first pulse of the i-th group, with respect to a value representative of the electric signal delivered by the photo-cell 17 when it receives the first pulse of the i-th group;

$B_{2i}$ is the ratio of a value representative of the electric signal delivered by the receiver 11 when it receives the echo of the second pulse of the i-th group with respect to a value representative of the electric signal delivered by the photo-cell 17 when it receives the second pulse of the i-th group; and the symbols $\Sigma A_{1i}B_{2i}$, $\Sigma B_{2i}$, $\Sigma A_{1i}B_{1i}$, $\Sigma B_{1i}$, $\Sigma(A_{1i}^2)$, and $\Sigma A_{1i}$ designate the sums of the different values of $A_{1i}B_{2i}$, $B_{2i}$, $A_{1i}B_{1i}$, $B_{1i}$, $A_{1i}^2$ and $A_{1i}$ respectively as i takes successively the values from 1 to N.

The representative values mentioned above may, for example, be the amplitudes of the signals delivered by the receivers 10 and 11 and the photo-cell 17. They could also be the energies or the peak powers of these signals.

FIG. 2 is a block diagram of a processing circuit 15 capable of determining the slope of the normalized covariance function on the basis of the equation (1) given above.

The circuit comprises a separator circuit 20 connected by a connection 21 to the output of the receiver 11 and by a connection 22 to the control circuit 9. The circuit 20 is capable of separating the first and second pulses of a single group delivered by the receiver 11 and in directing them respectively towards outputs 23 and 24.

A second separator circuit 25 is connected by a connection 26 to the output of the receiver 10 and by a connection 27 to the control circuit 9. The circuit 25 is capable of directing the first pulse of each group towards an output 28.

A third separator circuit 29 is connected by a connection 30 to the output of the photo-cell 17 and by a connection 31 to the control circuit 9. The circuit 29 is capable of separating the first and second pulses of a single group delivered by the photo-cell 17 and of directing them respectively towards outputs 32 and 33.

A divider circuit 34 which has two inputs respectively connected to the output 23 and 32 is arranged to divide the amplitude of the pulse delivered at 23 by the amplitude of the pulse delivered at 32. The circuit 34 thus delivers at both its outputs 35 and 36 a signal representative at the ratio $B_{1i}$.

A second divider circuit 37 whose two inputs are connected respectively to the outputs 24 and 33 is arranged to divide the amplitude of the pulse delivered at 24 by that of the pulse delivered at 33. The circuit 37 thus delivers at its two outputs 38 and 39 a signal representative of $B_{2i}$.

A third divider circuit 40 which has two inputs connected respectively to the outputs 28 and 32 is arranged to divide the amplitude of the pulse delivered at 28 by that delivered at 32. The circuit 40 therefore delivers at its three outputs 41, 42 and 43 a signal representative of $A_{1i}$.

A multiplying circuit 44 has its two inputs connected respectively to the outputs 43 and 38 and delivers a signal representative of $A_{1i} \times B_{2i}$ at its output. This signal arrives at the input to a summing circuit 45 which delivers at its output 46 a signal representative of $\Sigma A_{1i}B_{2i}$.

Another summing circuit 47 whose input is connected to the output 39 delivers a signal representative of $\Sigma B_{2i}$ at its output 48.

The outputs 46 and 48 are connected to two respective inputs of a divider circuit 49 arranged to deliver at its output 50 a signal representative of $$(\Sigma A_{1i}B_{2i})/(\Sigma B_{2i})$$

A multiplying circuit 51 has its two inputs connected respectively to the outputs 43 and 35 and delivers a signal representative of $A_{1i} \times B_{1i}$ at its outputs. This signal is applied to the input of a summing circuit 52 which delivers a signal representative of $\Sigma A_{1i}B_{1i}$ at its output 35.

Another summing circuit 54 has its input connected to the output 36 and delivers a signal representative of $\Sigma B_{1i}$ at its output 55. The two outputs 53 and 55 are connected to two respective inputs of a divider circuit 56 which delivers at its output 57 a signal representative of $$(\Sigma A_{1i}B_{1i})/(\Sigma B_{1i})$$

The two outputs 50 and 57 are connected respectively to two inputs of a difference circuit 58 arranged to deliver at its output 59 a signal representative of $$\frac{\Sigma A_{1i}B_{2i}}{\Sigma B_{2i}} - \frac{\Sigma A_{1i}B_{1i}}{\Sigma B_{1i}} \quad (2)$$

A multiplying circuit 60 whose input is connected to the output 41 is arranged to multiply this signal by itself and to deliver a signal representative of $A_{1i}^2$. This signal is applied at the input of a summing circuit 61 which delivers at its output 62 a signal representative of $\Sigma(A_{1i}^2)$.

A summing circuit 63 has its input connected to the output 42 and applies a signal representative of $\Sigma A_{1i}$ on both its outputs 64 and 65.

The output 64 of the summing circuit 63 is connected to the input of a multiplying circuit 66 arranged to multiply the signal by itself and to deliver a signal representative of $(\Sigma A_{1i})^2$ at its output 67.

The output 65 of the summing circuit 63 is connected to the input of a memory 68.

The outputs 62 and 67 are connected to the inputs of a divider circuit 69 arranged to deliver at its output 70 a signal representative of $$\frac{\Sigma(A^2_{1i})}{(\Sigma A_{1i})^2}$$

The output 70 is connected to an input of an difference circuit 71 whose other input is connected to the output of the circuit 72 and is arranged to produce a signal representative of a constant value 1/N.

The circuit 71 delivers at its output 73 a signal representative of $$\left[\frac{\Sigma(A^2_{1i})}{(\Sigma A_{1i})^2} - \frac{1}{N}\right]$$

The output 73 is connected to an input of a multiplying circuit 74 whose other input is connected to the output of the memory 68. The mulitplying circuit 74 is arranged to take the signal $A_{1i}$ from the memory 68 and to deliver at its output 75 a signal representative of the product:

$$\left[\frac{\Sigma(A^2_{1i})}{(\Sigma A_{1i})^2} - \frac{1}{N}\right] \times \Sigma A_{1i} \quad (3)$$

Finally the outputs 59 and 75 are respectively connected to two inputs of a divider circuit 76 which delivers at its output 77 a signal representative a quotient of the values expressed by equations (2) and (3). This signal is thus representative of the slope of the normalized covariance function whose value is given by equation (1). The constant factor 1/t has not been taken into account since the value of t is the same for all N groups of pulses emitted by the laser generator.

The output 77 of the circuit 76 is connected to the input of the indicator circuit 18 (FIG. 1).

The device described above and shown in FIGS. 1 and 2 is initially set up during experiments in which the wind speed is measured by other means, for example, by means of anemometers. The optimum values for the time interval t between two pulses of the same group and the distance between the two receivers depend on the order of magnitude of the wind to be measured, on the wavelength of the laser generator and on the distance to the target.

The device in accordance with the invention can be applied to an artillery firing control system.

It is possible as shown in FIG. 1 to add to the device in accordance to the invention, a clock 78 capable of measuring the time interval which sparates the emission of the laser pulses (for example the emission of a second laser pulse of each group) and the reception of the corresponding echoes at the receivers, in such a manner as to provide a telemetry function as well.

We claim:

1. A device for measuring a component of wind speed, the device comprising:
   a laser generator suitable for emitting a laser beam towards a target;
   two photo-electric receivers disposed transversally with respect to the emission axis of the laser generator to receive a part of the energy of said beam; and
   a circuit for processing the electrical signals delivered by the receivers to determine the slope at the origin of the normalized covariance function corresponding to these signals, the slope being representative of a weighted mean of the component of the speed of the wind blowing on the path of the laser beam in the direction of the straight line passing through the receivers;
   wherein the laser generator includes means for emitting said beam in successive groups of two pulses, the pairs of pulses being separated by a predetermined time interval; and wherein
   the receivers are so disposed in the proximity of said generator that each receives an echo of the laser pulses returned by the target.

2. A device according to claim 1, further including:
   a photocell disposed in the proximity of the laser generator to receive another part of the energy of said beam; and
   means for directing a small fraction of said beam taken from the output of the laser generatpr; and wherein the processing circuit is a circuit capable of determining the value of:
   the processing circuit (15) is a circuit capable of determining the value of:

$$\frac{\frac{\Sigma A_{1i}B_{2i}}{\Sigma B_{2i}} - \frac{\Sigma A_{1i}B_{1i}}{\Sigma B_{1i}}}{\left[\frac{\Sigma(A^2_{1i})}{(\Sigma A_{1i})^2} - \frac{1}{N}\right]\Sigma A_{1i}}$$

where:
N is the number of groups of pulses delivered by the laser generator;
i is an integer less than or equal to N;
$A_{1i}$ is the ratio of a characteristic of the electric signal delivered by a first one of the two receivers when it receives the echo of the first pulse of the i-th group, with respect to the same characteristic of the electric signal delivered by said photocell when it receives the first pulse of the i-th group;
$B_{1i}$ is the ratio of a characteristic of the electric signal delivered by the second of said receivers when it receives the echo of the first pulse of the i-th group, with respect to the same characteristic of the electric signal delivered by said photocell when it receives the first pulse of the i-th group;
$B_{2i}$ is the ratio of a characteristic of the electric signal delivered by the second of said receivers when it receives the echo of the second pulse of the i-th group, with respect to the same characteristic of the electric signal delivered by said photocell when it receives the second pulse of the i-th group; and
the symbols $\Sigma A_{1i}B_{2i}$, $\Sigma B_{2i}$, $\Sigma A_{1i}A_{1i}$, $\Sigma B_{1i}$, $\Sigma(A_{1i}^2)$, $\Sigma A_{1i}$ 35 designate the sums of the different values of $A_{1i}B_{2i}$, $B_{2i}$, $A_{1i}B_{1i}$, $B_{1i}$, $A_{1i}^2$ and $A_{1i}$ respectively as i taken successively the values from 1 to N.

3. A device according to claim 2, wherein the said characteristics of electrical signals are the amplitudes of the signals.

4. A device according to claim 2, wherein the said characteristics of the electrical signals are the energies of the signals.

5. A device according to claim 1, wherein the said laser generator comprises an active material disposed in a resonant optical cavity and an optical exciting system for the material including a discharge lamp, the said means for emitting said beam in successive groups of two pulses are means for causing successive discharges of the lamp and for triggering two laser pulses during each discharge of the lamp.

6. A device for measuring a component of wind speed and the range of a target, the device comprising a device according to claim 1 and further including a clock capable of measuring the time interval between the emission of the said laser pulses and their reception by the said receivers.

* * * * *